(12) United States Patent
Culpepper et al.

(10) Patent No.: US 7,395,915 B2
(45) Date of Patent: Jul. 8, 2008

(54) ARTICLE TRANSPORT, METERER AND LOADER

(75) Inventors: Will L. Culpepper, Covington, GA (US); Glenn Robinson, Alpharetta, GA (US); Johnny J. Hunter, Woodstock, GA (US)

(73) Assignee: Mead Westvaco Packaging Systems, LLC, Glen Allen, VA (US)

( * ) Notice: Subject to any disclaimer, the term of this patent is extended or adjusted under 35 U.S.C. 154(b) by 766 days.

(21) Appl. No.: 09/839,616

(22) Filed: Apr. 20, 2001

(65) Prior Publication Data

US 2002/0074212 A1     Jun. 20, 2002

Related U.S. Application Data

(63) Continuation of application No. PCT/US99/24534, filed on Oct. 20, 1999.

(51) Int. Cl.
*B65G 47/26* (2006.01)

(52) U.S. Cl. .................................. 198/432; 198/419.2
(58) Field of Classification Search ............ 198/419.2, 198/432, 597, 456, 457.01; 53/251, 534, 53/543, 566
See application file for complete search history.

(56) References Cited

U.S. PATENT DOCUMENTS

| | | | |
|---|---|---|---|
| 3,778,959 A | 12/1973 | Langen et al. | 53/543 |
| 4,880,104 A | 11/1989 | Evans et al. | 198/445 |
| 4,887,414 A | 12/1989 | Arena | 53/543 |
| 5,241,806 A | 9/1993 | Ziegler et al. | 53/566 |
| 5,546,734 A | 8/1996 | Moncrief | 53/534 |
| 5,775,067 A | 7/1998 | Hawley | 53/543 |

FOREIGN PATENT DOCUMENTS

| | | |
|---|---|---|
| DE | 295 01 098.3 | 4/1995 |
| DE | 44 39 866 A1 | 3/1996 |

*Primary Examiner*—James R Bidwell
(74) *Attorney, Agent, or Firm*—Karen L. Ware

(57) ABSTRACT

An article transport, meterer and loader has a plurality of parallel lanes disposed above and in angular relation to a direction of transport of a plurality of article conveyors.

4 Claims, 5 Drawing Sheets

ARTICLE TRANSPORT, METERER AND LOADER

This is a continuation of international application No. PCT/US99/24534, filed Oct. 20, 1999, which is at pending the time of filing hereof, and which international application claims priority based upon U.S. patent application Ser. No. 09/175,811, filed Oct. 21, 1998, now abandoned.

The invention relates to continuous-motion packaging machines, and, more particularly, to an article transport, meterer and loader which includes a parallel lane arrangement disposed above and in angular relation to the direction of transport of multiple parallel conveyors.

Continuous-motion cartoning machines are useful for packaging multiple articles such as beverage cans in cartons or other packaging components. An example of a continuous-motion cartoning machine is shown in U.S. Pat. No. 5,241,806 to Ziegler et al.

An important function in packaging machines is the transport of articles from a first machine location along a length of the machine to a second machine location where the articles are ultimately urged into, or otherwise placed in, a carton. It is important that article transport and loading be accomplished as rapidly and reliably as possible. It can be appreciated that it would be useful to have a means for transporting and loading article which is rapid and reliable.

BRIEF SUMMARY OF THE INVENTION

An article transport, meterer and loader according to a preferred embodiment of the invention has a plurality of parallel lanes disposed above and in angular relation to a direction of transport of a plurality of article conveyors.

Other advantages and objects of the present invention will be apparent from the following description, the accompanying drawings, and the appended claims.

DETAILED DESCRIPTION OF A PREFERRED EMBODIMENT

Figure 1:
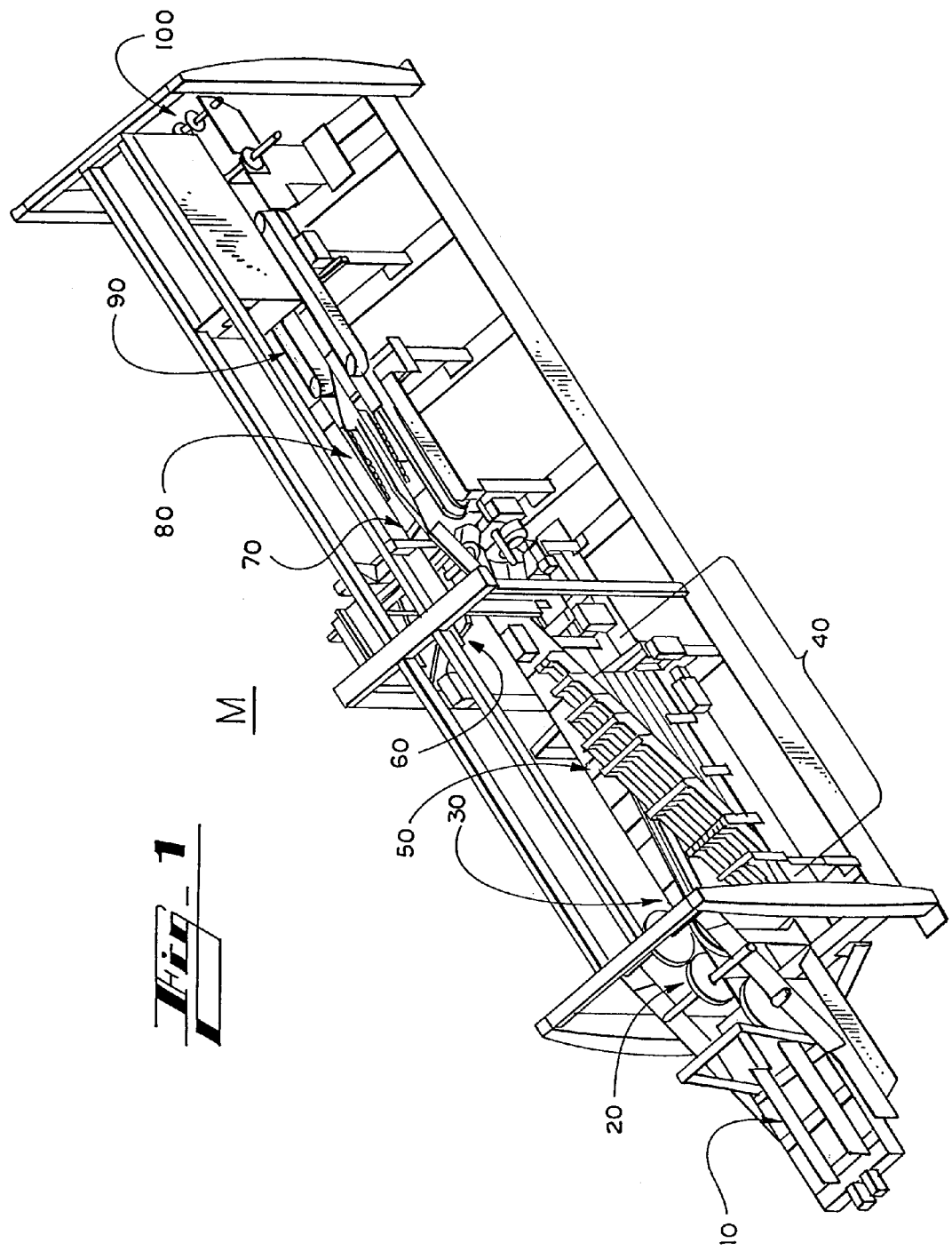
FIG. 1 is an isometric illustration of a continuous-motion cartoning machine which incorporates an article transport, meterer and loader in accordance with a preferred embodiment of the invention.

Throughout the drawings the same reference numerals are used to denote the same or like features of the invention.

Referring first to FIG. 1, therein is illustrated in the context of a continuous-motion cartoning machine M, an article transport, meterer and loader 40, 50, in accordance with a preferred embodiment of the invention. In the machine, the carton hopper 10 receives collapsed cartons C stacked in substantially upright condition as shown. Cartons C are withdrawn from the carton hopper 10 by the adjustable carton feeder 20 and then deposited in substantially erect condition at the beginning of the carton conveyor 30. As cartons are continuously engaged and translated through the machine M, articles, such as beverage cans, to be packaged in the cartons C are also translated through the machine in synchronous motion with the cartons. An article conveyor 40 and article lane arrangement 50 form an article transport, meterer and loader that urges the articles into the cartons C. Article-engaging wheels 60 complete the process of placement of the articles into cartons C. Side-flap folding wheels 70 (partially obstructed in FIG. 1) engage and inwardly fold the side flaps of cartons having side flaps. Glue is applied to the cartons C at a gluing station 80. At a sealing station 90, end flaps of the cartons C are pressed and held into contact with glue that has been previously applied. Packaged, sealed cartons are ejected from the machine at the ejection station 100.

Figure 2:
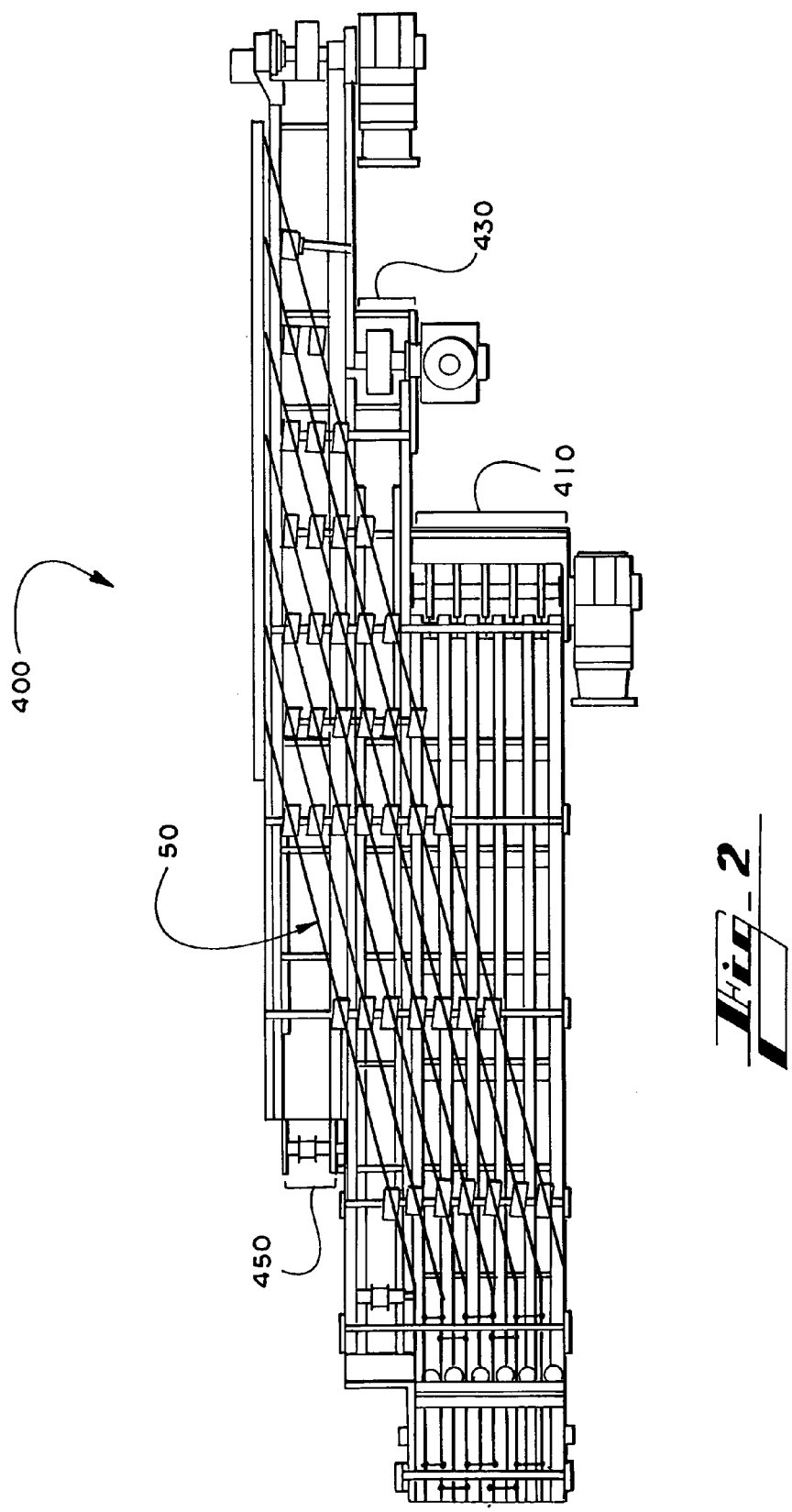
FIG. 2 is an isometric illustration of an article transport, meterer and loader in accordance with a preferred embodiment of the invention.

Referring now to FIG. 2, therein is shown in plan view the layout of an article transport, meterer and loader 400 in accordance with a preferred embodiment of the invention. A parallel lane arrangement 50 is positioned above and in angular, or diagonal, relation to the direction of orientation of multiple endless chains, more commonly known as conveyors. In the preferred embodiment illustrated, there are three conveyors 410, 430, 450. In FIG. 2, the framework and motors for the conveyors 410, 430, 450 are shown.

Figure 3:
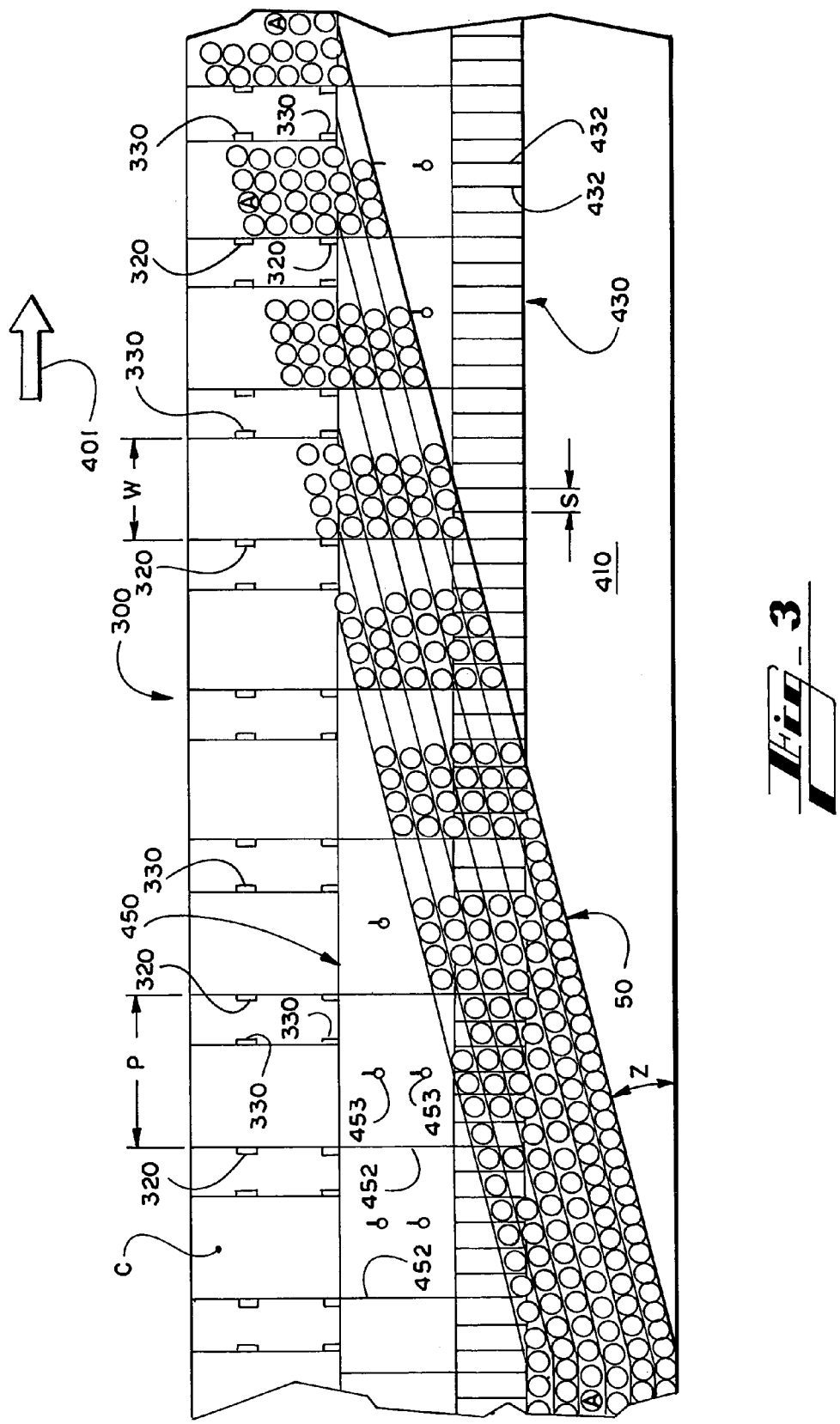
FIG. 3 is a schematic representation of the invention of FIG. 2, in a first configuration.
Figure 4:
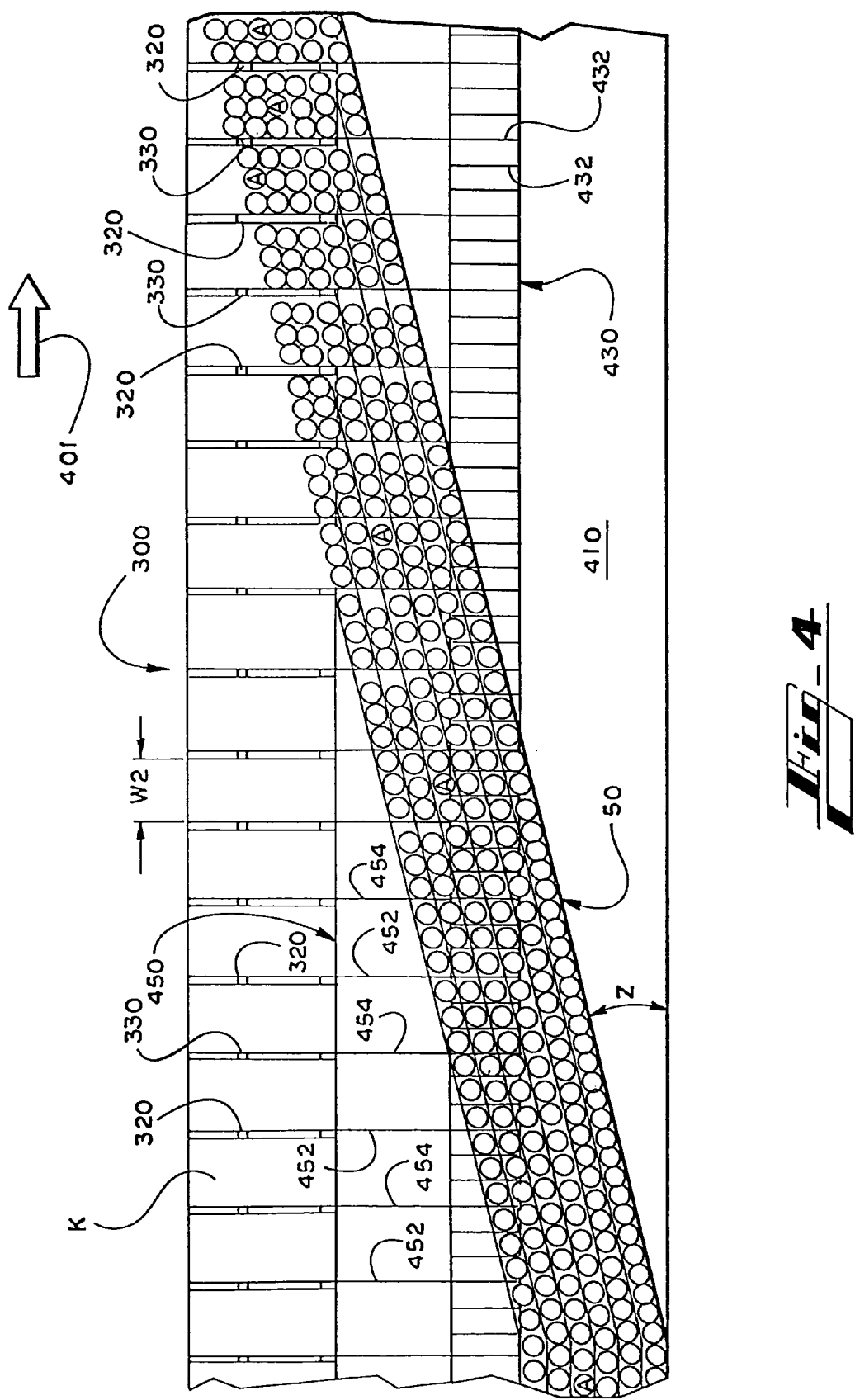
FIG. 4 is a schematic representation of the invention of FIG. 2, in a second configuration.
Figure 5:
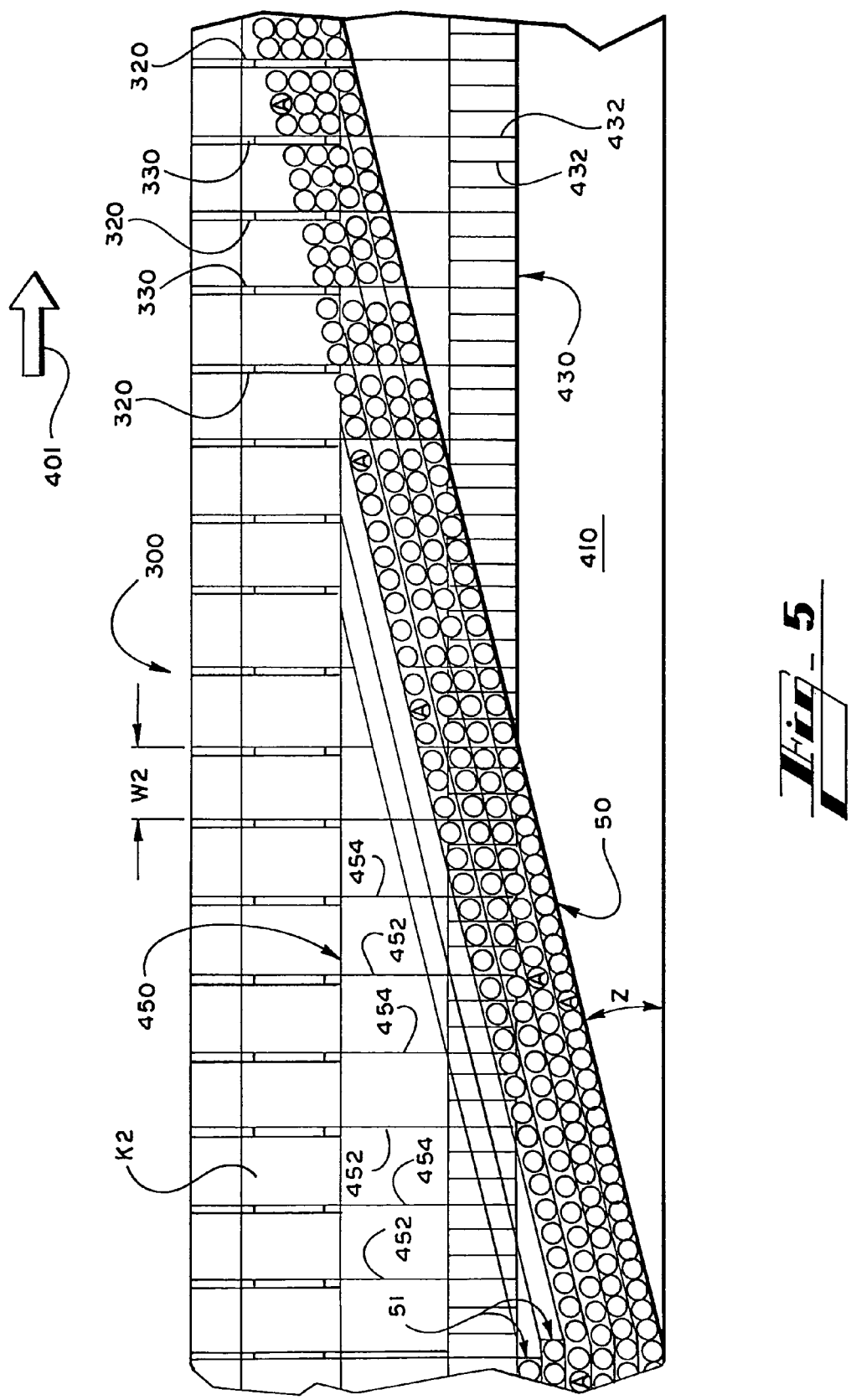
FIG. 5 is a schematic representation of the invention of FIG. 2, in a third configuration.

The structure and operation of the invention is described further by reference to the schematic illustrations of FIG. 3, FIG. 4 and FIG. 5. Referring first to FIG. 3, the invention is shown positioned with a carton conveyor 300. For convenience and clarity of illustration the bottoms of cartons C transported by the carton conveyor 300 are also shown. The four conveyors 410, 430, 450, 300 move in timed relationship with respect to one another in the direction indicated by the direction arrow denoted 401.

What may for reference be considered the first conveyor is an article infeed conveyor 410. The article infeed conveyor 410 transports articles A, such as beverage cans, into the packaging machine. Initially, or at the up-stream segment of the machine, the lane arrangement 50 is generally disposed in parallel alignment with the article infeed conveyor 410 such that the articles A are transported within the lanes of the lane arrangement 50. As the lane arrangement extends downstream it extends diagonally across the article conveyor 410 and across the two adjacent conveyors 410, 450. Movement of the conveyor 410 in the downstream direction 401 carries the articles diagonally downstream and into intersection with the adjacent metering conveyor 430.

The metering conveyor 430 is for convenience of reference considered the second conveyor. The metering conveyor 430 has transverse article lanes formed by transverse metering lugs 432. Optimally, the metering lugs 432 are spaced apart sufficiently to permit articles to move freely through the lanes. The optimum lane width in the preferred embodiment is slightly more than the diameter of the articles being transported. For example, the diameter of a typical metal beverage can is slightly less than 3 inches, generally 65 millimeters, or about 2.6 inches. A suitable metering lug spacing is about 3 inches.

The downstream 401 movement of the metering conveyor 430 produces an interaction between the articles A being transported downstream, the metering lugs 432 and the lanes of the lane arrangement 50 such that as the articles A are engaged by the metering lugs 432 they are urged both transversely through the lanes formed by the metering lugs 432 and diagonally downstream through the lanes of the lane arrangement. The metering conveyor 430 transports the articles A to intersection with a grouping conveyor 450. The linear speed of the infeed conveyor 410 is greater than the linear speed of the metering conveyor 430 so that a constant line pressure of articles A suitable for consistently feeding the adjacent conveyors without interruption is maintained.

The grouping conveyor 450 contains grouping lugs 452 which extend transversely across the grouping conveyor 450. The grouping lugs 452 are spaced apart so as to provide extended lanes having spacings greater than the spacings of the metering lugs 432. The grouping lugs 452 are spaced apart so as to accommodate a "group" or array of articles A while the metering lugs 432 are spaced apart to accommodate a single row of articles A. In the preferred embodiment illustrated the grouping lugs 452 are spaced apart at a multiple of the spacings of the metering lugs 432. A means is provided for attachment of additional, or auxiliary, grouping lugs 454 (to be described in greater detail below) that partitions the spacing between the grouping lugs 452 into smaller spacings. Although many means of detachable mounting may be use, keyhole apertures 453 are used in the preferred embodiment.

It is also to be noted that in the preferred embodiment illustrated, each grouping lug 452 is in alignment with a pair of trailing lugs 320 of the carton conveyor 300. The grouping conveyor 450 and carton conveyor 300 move at the same linear speed. Effectively, an array of articles A moves between the grouping lugs and is urged downstream through the lanes of the lane arrangement by the engagement of a grouping lug 452 which trails the array. The number of articles A, and spacing therebetween, which move through each spacing of grouping lugs 452 is determined by the linear speed of the metering conveyor 430 in relation to the linear speed of the infeed conveyor 410 and the linear speed of the grouping conveyor 450. The faster the metering conveyor 430 moves, the more articles A are passed through each of the grouping lug 452 spacings.

Referring now to FIG. 3 and FIG. 4 simultaneously, the operation and structure of the invention will be described in greater detail. It is to be noted that in FIG. 3, FIG. 4 and FIG. 5 the metering conveyor 430 and grouping conveyor 450 are shown in an alignment wherein each grouping lug 452 is in alignment with one of the metering lugs 432. However, this alignment is primarily for convenience of explanation and discussion. When the metering conveyor 430 is moving at a linear speed different than that of the grouping conveyor 450 the alignment of the grouping lugs 452 and metering lugs 432 will constantly change.

A proportioned relationship exists among the spacing between carton lugs 320, 330, the spacing between the grouping lugs 452 and spacing between the metering lugs 432. In the preferred embodiment illustrated, FIG. 3 illustrates a spacing of carton lugs 320, 330 to accommodate a carton C for packaging 24 articles A in four rows, each row containing six articles A. As is illustrated, the number of articles in each row corresponds to the number of lanes in the lane arrangement, in this case, six. As previously mentioned, each carton C is depicted as having its top panel removed so that the interior of the carton C is visible.

The grouping lugs 452 are spaced apart to correspond to the spacing between trailing carton lugs 320. As will be explained further below, in the preferred embodiment this spacing is essentially a "base" spacing which base spacing can be used in its entirety for loading cartons C of one designated size and which base spacing can be apportioned for loading cartons K of a different designated size. The distance between trailing lugs 320 is denoted by P and may be considered the "pitch" of the machine, that is, the base interval or carton spacing for the machine. As previously mentioned, the diameter of a typical beverage can is about 65 millimeters, which equals to about 2.6 inches, that is, slightly less than 3 inches. In correspondence with the article A size (that is, cans of a diameter of slightly less than 3 inches) in the preferred embodiment, the spacing or pitch P is a multiple of 3 inches, namely 18 inches. The 24-article carton is configured to receive a 4×6 array. The width of carton C necessary to accommodate 4 rows is less than the full 18-inch pitch. Leading lugs 330 are spaced a distance apart denoted by the letter W. A suitable dimension for W in correspondence with the article A dimension is 12 inches. Thus, in the preferred embodiment illustrated a proportional relationship for the spacings of carton lugs 320, 330, grouping lugs 452 and metering lugs 432 can be described where S represents the spacing between metering lugs 432 to accommodate articles A, P represents the pitch and the spacing between trailing carton lugs 320 and the spacing between grouping lugs 452, W represents the spacing between trailing 320 and leading 330 carton lugs for a designated carton size and configuration, and n represents the number of rows to be grouped and packaged, then $$P = \text{maximum } n \times S,$$

$$W = n \times S$$

In the preferred embodiment the maximum number of rows to be packaged is 6, thus, setting n at 6 gives a pitch P of 18 inches. The number of rows to be packaged in the carton C shown is 4, thus, for carton C, W=4×S=12 inches.

In the configuration of FIG. 3 where less than the fall pitch of the machine is to be packaged, the metering conveyor 430 travels at a linear speed less than the linear speed of the grouping conveyor 450 and carton conveyor 300 in order to place less than the maximum number of articles A between the grouping lugs 452. The relationships between the linear speeds of the conveyors can be described in mathematical terms where V1 represents the linear speed of the article infeed conveyor 410, V2 represents the linear speed of the metering conveyor 430, V3 represents the linear speed of the grouping conveyor 450, and V4 represents the linear speed of the carton conveyor 300. The general relationships are $$V3 = V4$$

$$V1 > V2$$

$$V1 > V3.$$

For the size of array facilitated in FIG. 3, that is, where the metering conveyor 430 runs at a slower speed than the grouping conveyor 450, $$V1 > V3 > V2$$

The versatility which the invention enables is illustrated by reference to FIG. 4. FIG. 4 is an alternate grouping-lug placement which facilitates loading of cartons K of a different size than those shown in FIG. 3. It is to be noted that although the present invention is not limited to a use in conjunction with a carton conveyor 30, such an arrangement is a preferred mode of use.

In FIG. 4, the selected carton configuration accommodates a 3×6 array for an 18-pack. Although each carton K is of a smaller size that the carton C illustrated in FIG. 3, the full, or maximum, pitch P must be accommodated. Thus, the linear speed V2 of the metering conveyor 430 is increased to the speed V3 of the grouping conveyor 450, that is, V2=V3=V4.

In this configuration each trailing 320 and leading 330 lug serves both functions, that is, as a leading and trailing lug. The smaller carton K is 9 inches (for 3 rows), or one-half the pitch P. Auxiliary grouping lugs 454 are attached to the grouping conveyor to create spacings on the grouping conveyor 450 that correspond to the spacings W2 of the carton conveyor. In the preferred embodiment illustrated, the keyhole apertures 453 (shown in FIG. 4) are the means through which the auxiliary grouping lugs are attached.

FIG. 5 illustrates an additional alternate embodiment of the invention in which the elements of the invention are modified slightly to accommodate a 3×4 array to be received at the carton conveyor 300 and packaged in a carton K2. Because there is a one-to-one relationship between the number of articles A in a row and the number of lanes of the lane arrangement 50, the number of articles A in a row is reduced by reducing the number of lanes used. In FIG. 5, in the preferred embodiment of the invention illustrated, the two innermost lanes are disabled to achieve 4-article rows. Although any combination of lanes may be disabled to achieve smaller arrays of articles, continued engagement of the outermost lanes helps facilitate stability during the packaging process in that the outermost lanes are the lanes that are packaged closest to the next station in the machine. This proximity to the next station reduces the amount of time that the fully-loaded carton travels through the machine until closure and, thus, reduces the possibility of instability of articles A within the carton. The lanes are obstructed by any suitable means such as use of detachably mounted obstructions 51. Any simple means such as a clamp may be used.

Referring again to either FIG. 3, FIG. 4 or FIG. 5, it is to be noted that the angle Z at which the lanes extend diagonally across the conveyors 410, 430, 450 may vary. However, in the preferred embodiment illustrated and discussed herein an optimum angle Z for achieving the synchronous article transport, metering and loading described herein is about 20 degrees, and even more specifically, about 18.7 degrees.

Modifications may be made in the foregoing without departing from the scope and spirit of the claimed invention. For example,

What is claimed is:

1. An article transport, meterer and loader, comprising:
   a plurality of parallel article lanes disposed in vertical relation above and in angular relation to a direction of orientation of a plurality of parallel conveyors, said plurality of parallel conveyors including:
   a first article infeed conveyor operating at a first linear speed;
   a second metering conveyor operating at a second linear speed having a plurality of transverse metering lugs disposed at article intervals; and
   a third grouping conveyor operating at a third linear speed having a plurality of transverse grouping lugs disposed at predetermined group intervals;
   wherein said first linear speed is greater than said third linear speed, said second linear speed is less than said first linear speed, and said second linear speed is selectively variable with respect to said third linear speed;
   whereby articles are metered from said first article infeed conveyor by said second metering conveyor into an article array formed between adjacent said transverse grouping lugs and subsequently urged from said third grouping conveyor in said array.

2. The invention of claim 1, wherein said second linear speed is less than said third linear speed.

3. The invention of claim 1, wherein said second linear speed is substantially equal to said third linear speed.

4. The invention of claim 1, wherein said plurality of parallel article lanes are selectively engageable.

* * * * *